US006815644B1

(12) United States Patent
Muegge et al.

(10) Patent No.: US 6,815,644 B1
(45) Date of Patent: Nov. 9, 2004

(54) MULTIRACK COOKING IN SPEEDCOOK OVENS

(75) Inventors: Coleen Judith Muegge, Louisville, KY (US); Jennifer Elizabeth Rael, Louisville, KY (US); Karen Edberg, Louisville, KY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/389,874

(22) Filed: Mar. 17, 2003

(51) Int. Cl.[7] .......................... F24C 7/02; F24C 15/16; A21B 1/40; A21B 1/50

(52) U.S. Cl. ...................... 219/393; 219/396; 219/398; 219/400; 219/411; 219/413; 219/489; 219/681; 219/685; 126/337 R; 126/332

(58) Field of Search ................................ 219/393, 396, 219/398, 400, 411, 413, 486, 489, 492, 494, 680, 681, 683, 685; 126/21 A, 337 R, 337 A, 332, 339

(56) References Cited

U.S. PATENT DOCUMENTS 4,105,886 A 8/1978 Baron et al.
4,188,520 A 2/1980 Dills
4,196,330 A 4/1980 Payne
4,198,553 A 4/1980 Dills
4,227,062 A 10/1980 Payne et al.
4,242,554 A 12/1980 Hurko et al.
4,547,642 A 10/1985 Smith
5,111,028 A * 5/1992 Lee ............................ 219/413
5,954,986 A 9/1999 Tsukamoto et al.
6,252,206 B1 * 6/2001 Leukhardt et al. .......... 219/680
6,291,808 B1 9/2001 Brown
6,333,492 B1 12/2001 Graves et al.
6,399,930 B2 6/2002 Day et al.
6,472,647 B2 10/2002 Lee et al.
6,486,453 B1 * 11/2002 Bales et al. ................. 219/400
6,525,301 B1 2/2003 Graves et al.
6,528,772 B1 3/2003 Graves et al.
6,528,773 B2 3/2003 Kim et al.
6,541,746 B2 4/2003 Kim et al.
6,727,478 B2 * 4/2004 Rael et al. .................. 219/413
6,730,879 B1 * 5/2004 Muegge et al. ............. 219/393
6,730,880 B2 * 5/2004 Smith et al. ................ 219/400
6,730,881 B1 * 5/2004 Arntz et al. ................ 219/400

FOREIGN PATENT DOCUMENTS

JP 06229559 A * 8/1994

* cited by examiner

*Primary Examiner*—Joseph Pelham
(74) *Attorney, Agent, or Firm*—H. Neil Houser, Esq.; Armstrong Teasdale LLP

(57) ABSTRACT

A multirack speedcook oven includes a cooking cavity, a plurality of racks within the cooking cavity, an RF generation module operationally coupled to the cooking cavity and configured to deliver microwave energy into the cooking cavity, at least one heat source positioned within the cavity and configured to supply heat energy to the cooking cavity, and a control configured to accept data regarding said plurality of racks, the control operationally coupled to the RF generation module, and the at least one heat source for selective control thereof based on the accepted data.

20 Claims, 8 Drawing Sheets

700

Example of Multitrack Cooking Algorithm:

| Radiant Elements | | | Microwave | Fan Cycling - Preheat & Cooking | | | |
|---|---|---|---|---|---|---|---|
| Bake Element | Conv Element | Broil Element | Microwave | Conv Fan | 1st Fan - CW | 3rd Fan - CCW | 2nd & 4th Fan - off time |
| Off | 60secOn/ 0secOff | Off | 7s On/23s Off | On | 30 sec | 30 sec | 10 sec |

710 720 730

700

Example of Multitrack Cooking Algorithm:

| Radiant Elements | | | Microwave | Fan Cycling - Preheat & Cooking | | | |
|---|---|---|---|---|---|---|---|
| Bake Element | Conv Element | Broil Element | Microwave | Conv Fan | 1st Fan - CW | 3rd Fan - CCW | 2nd & 4th Fan - off time |
| Off | 60secOn/ 0secOff | Off | 7s On/23s Off | On | 30 sec | 30 sec | 10 sec |

710 720 730

FIG. 8

MULTIRACK COOKING IN SPEEDCOOK OVENS

BACKGROUND OF THE INVENTION

This invention relates generally to ovens and, more particularly, to an oven operable in speedcooking, microwave, and convection/bake modes.

Ovens typically are either, for example, microwave, radiant, or thermal/convection cooking type ovens. For example, a microwave oven includes a magnetron for generating RF energy used to cook food in an oven cooking cavity. Although microwave ovens cook food more quickly than radiant or thermal/convection ovens, microwave ovens do not brown the food. Microwave ovens therefore typically are not used to cook as wide a variety of foods as radiant or thermal/convection ovens.

Radiant cooking ovens include an energy source such as lamps which generate light energy used to cook the food. Radiant ovens brown the food and generally can be used to cook a wider variety of foods than microwave ovens. Radiant ovens, however, cook many foods slower than microwave ovens.

In thermal/convection ovens, the food is cooked by the air in the cooking cavity, which is heated by a heat source. Standard thermal ovens do not have a fan to circulate the hot air in the cooking cavity. Convection ovens use the same heat source as a standard thermal oven, but add a fan to increase cooking efficiency by circulating the hot air around the food. Thermal/convection ovens cook the widest variety of foods. Such ovens, however, do not cook as fast as radiant or microwave ovens.

One way to achieve speedcooking in an oven is to include both microwave and radiant energy sources in a microwave assist mode. The combination of microwave and radiant energy sources facilitates fast cooking of foods. In addition, and as compared to microwave only cooking, a combination of microwave and radiant energy sources can cook a wider variety of foods.

Microwave assist ovens do not feature multirack cooking in their speedcook modes or do not recommend cooking multiple racks of food in the speedcook mode. With the addition of multiple racks in the oven, evenness of cooking becomes a greater issue. The relative position of food within the cooking cavity with respect to the air flow paths within the oven impacts the evenness of cooking. For example, if a portion of the food is directly in the flow path of air from the convection fan, such food portion may cook more quickly than another portion of the food that is not in the direct air flow path. Uneven cooking can cause variation in browning and a darkening around the edges in baked products.

BRIEF DESCRIPTION OF THE INVENTION

In one aspect, an oven includes a cooking cavity, a plurality of racks within the cooking cavity, an RF generation module operationally coupled to the cooking cavity and configured to deliver microwave energy into the cooking cavity, at least one heat source positioned within the cavity and configured to supply heat energy to the cooking cavity, and a control configured to accept data regarding said plurality of racks, the control operationally coupled to the RF generation module, and the at least one heat source for selective control thereof based on the accepted data.

In another aspect, a method for operating a multirack oven having a microcomputer, an RF generation module, a bake element, a broil element, and a convection element, includes, obtaining at least one input from a user indicative of whether the oven is to operate in a microwave mode, a convection mode, a bake mode, a broil mode, and a speedcooking mode, obtaining a further input from a user indicative of a number of racks, and energizing the RF generation module, the bake element, the broil element, and the convection element in accordance with the user input.

In yet another aspect, a method for operating a speedcook oven in a speedcook mode, includes, receiving an indication of a number of racks, operating the oven in a predetermined radiant cooking cycle based on the received indication of a number of racks, operating the oven in a predetermined microwave cooking cycle based on the received indication of a number of racks, operating the oven in a predetermined convection fan cycle based on the received indication of a number of racks, and wherein the operating steps are performed concurrently for a user specified cooking time.

BRIEF DESCRIPTION OF THE DRAWINGS

FIG. 8 is a chart of a speedcook algorithm for use in multirack cooking.

DETAILED DESCRIPTION OF THE INVENTION

In the exemplary embodiment, the methods and apparatus described herein are applicable to the operation of an oven that includes sources of radiant and microwave energy as well as a convection heating element and a bake heating element. Although three specific embodiments of such an oven are described herein, it should be understood that the present invention can be utilized in combination with many other such ovens and is not limited to practice with the ovens described herein. For example, one oven described herein below is a speedcook oven including a range. The present invention, however, is not limited to practice with just full-size ovens that include a rangetop, but can be used with many other types of ovens such as countertop or built-in wall ovens, over the range type ovens, and a double wall oven.

Figure 1:
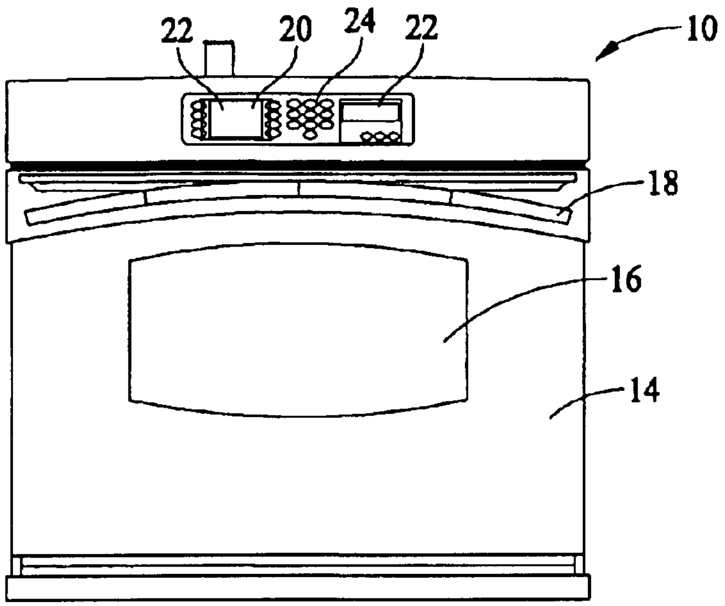
FIG. 1 is a front view of a speedcook wall oven.
Figure 2:
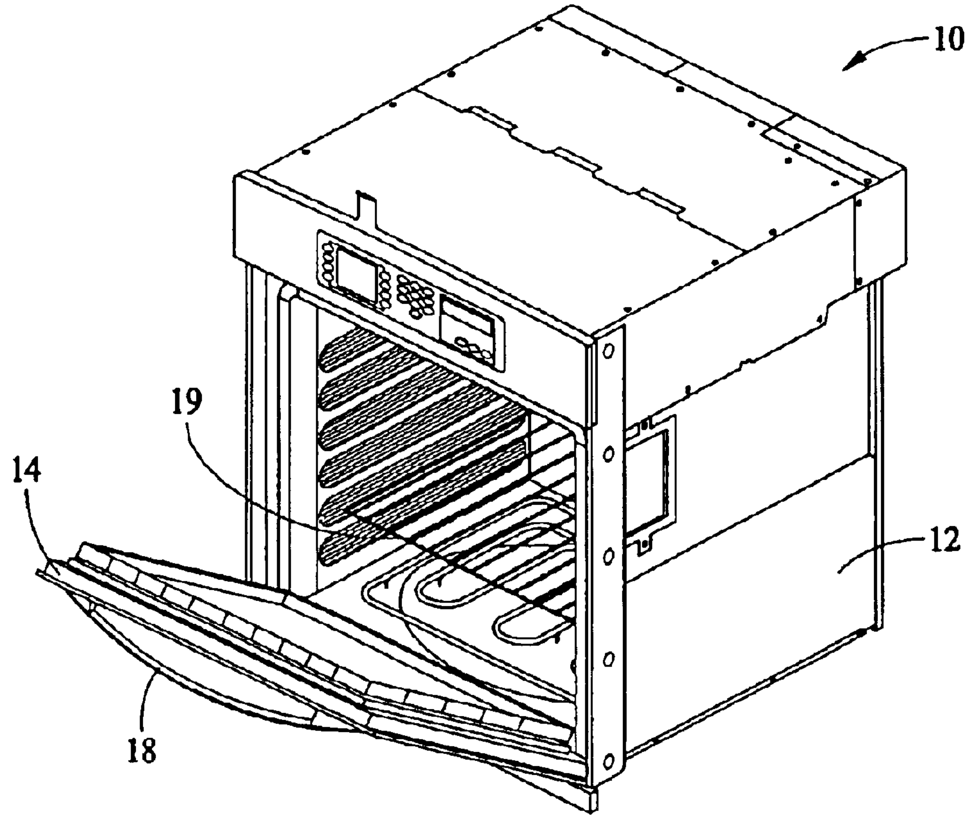
FIG. 2 is a perspective view of the oven shown in FIG. 1.
Figure 3:
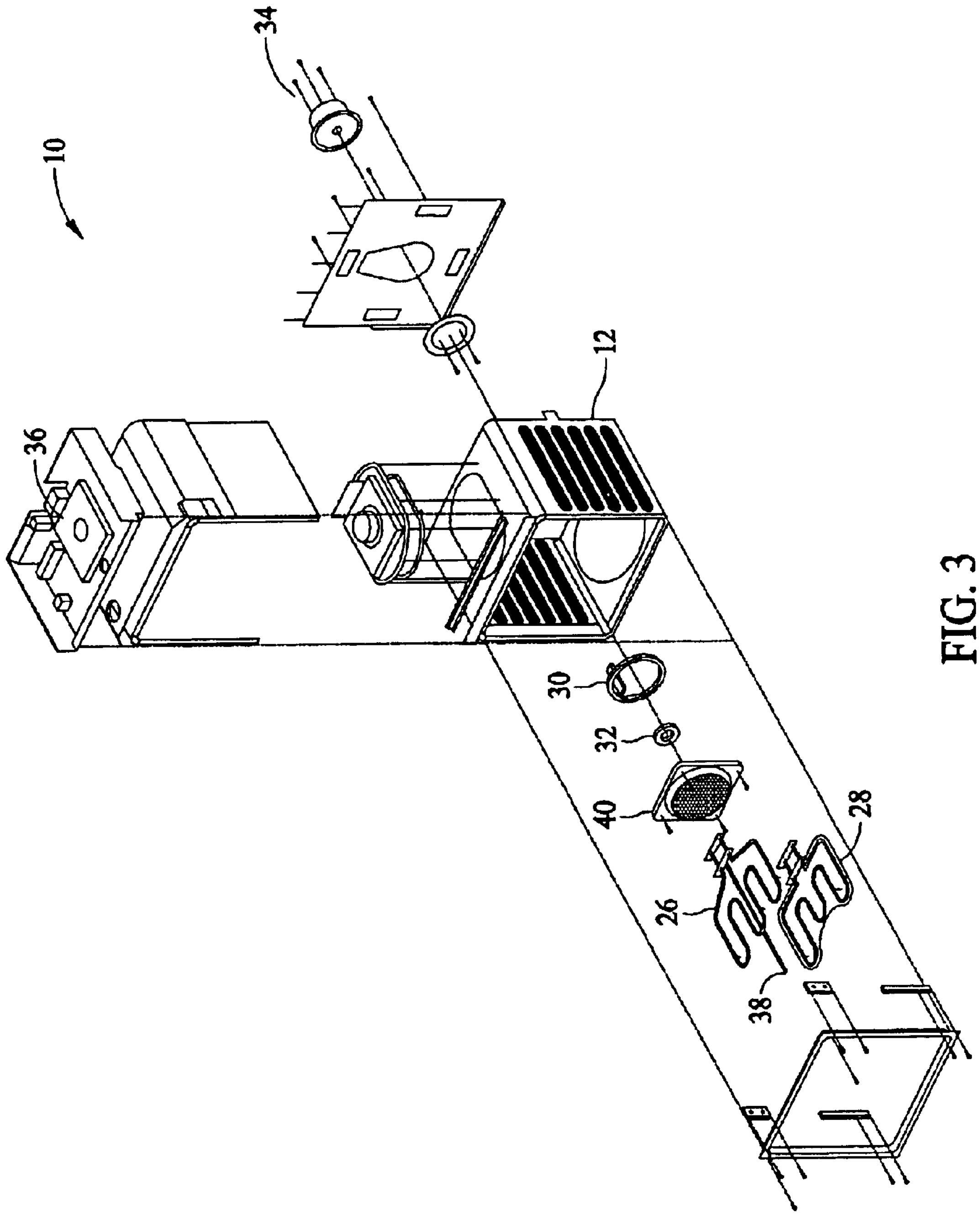
FIG. 3 is an exploded view of the oven shown in FIG. 1 and FIG. 2.

FIG. 1 is a front view of a speedcook oven 10. FIG. 2 is a perspective view of speed cook oven 10. FIG. 3 is an exploded view of the oven shown in FIG. 1 and FIG. 2. In the exemplary embodiment, speedcook oven 10 includes an oven cavity 12, a door 14 including a window 16 provided for viewing food in oven cooking cavity 12, and a handle 18 secured to door 14. Oven 10 also includes a control panel 20 that includes at least one display 22, a plurality of tactile control buttons 24, and various knobs or dials.

Speedcooking oven 10 includes a broil heating element 26, a bake heating element 28, a convection heating element

30, a convection fan 32, and a convection motor 34 mechanically coupled to convection fan 32 such that heat generated by convection element 30 is provided to oven cavity 12. Speedcooking oven 10 also includes a magnetron 36 and a temperature sensor 38 configured to sense the temperature within cavity 12. Broil heating element 26 is located at a top area inside speedcooking oven 10 and bake heating element 28 is located at a bottom area inside speedcooking oven 10. Convection heating element 30 and convection fan 32 are located at a back area inside speedcooking oven 10. A cover 40 can be provided to shield a user from convection heating element 30 and convection fan 32. Magnetron 36 is located above broil heating element 26. A plurality of removable oven racks 19 are positioned within oven cavity 12.

Magnetron 36 generates microwave energy to speed cook various food items, which are supported by racks 19. The microwaves are evenly distributed inside speedcooking oven 10 by a microwave dispersement plate (not shown in FIGS. 1–3) positioned between magnetron 36 and broil heating element 26. The microwave dispersement plate is similar to the match plate described in U.S. Pat. No. 6,452,142. Door 14 of speedcooking oven 10 allows access to speedcooking oven 10. Door 14 includes an interlock (not shown) configured to de-energize magnetron 36 when door 14 is opened while continuing cycling of the other heating elements. In use, broil heating element 26, bake heating element 28, convection heating element 30, and convection fan 32 will continue to operate in accordance with the methods described herein for a first time to allow an operator to enter additional cooking time if desired or to check on the completeness of the food. At the completion of the first time, all heating elements still operating will be de-energized.

Figure 4:
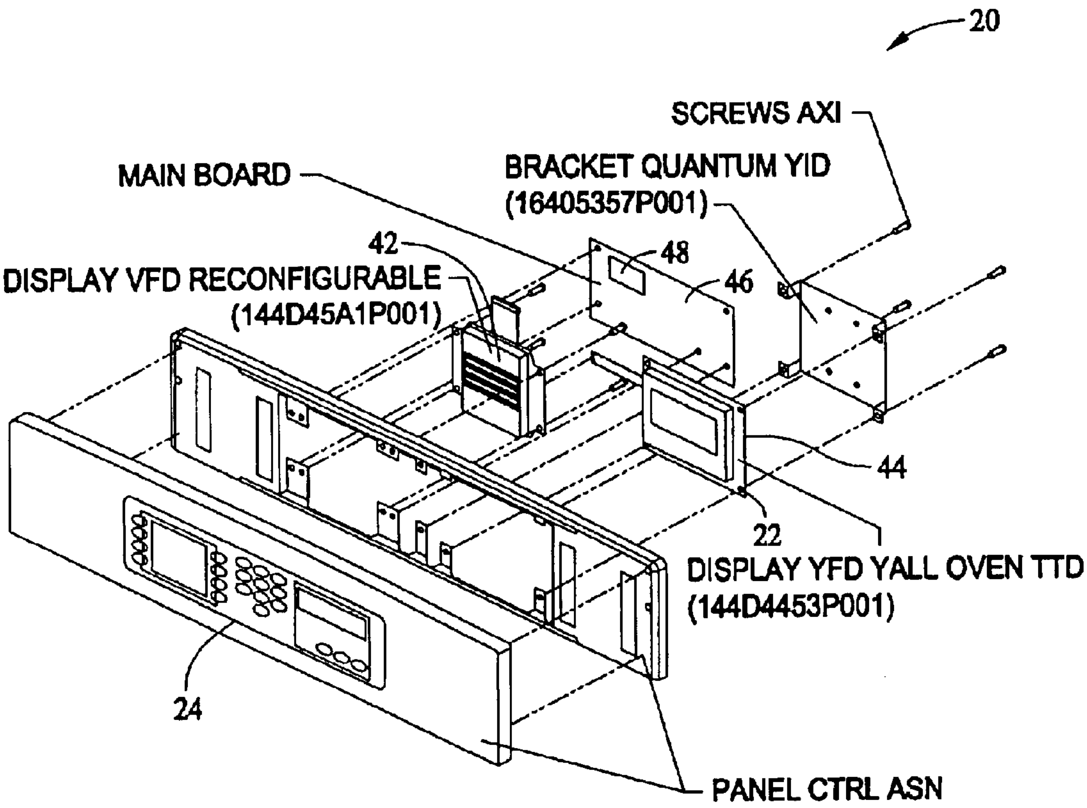
FIG. 4 is an exploded view of control panel that can be used with the oven shown in FIG. 1, FIG. 2, and FIG. 3.

FIG. 4 is an exploded view of control panel 20 that includes a first display 42, a second display 44, and a control board 46. In the exemplary embodiment, first display 42 is an alphanumeric menu display 42 that allows the user to choose between various functions that speedcooking oven 10 performs, and second display 44 is a status display 44 that notifies the user of various conditions inside speedcooking oven 10. For example, status display 44 can notify the user that the temperature inside speedcooking oven is 327 degrees Fahrenheit.

Speedcooking oven 10 also include a microprocessor 48 positioned on a control board 46 and electrically coupled to alphanumeric display 42. Microprocessor 48 is configured to operate various components of oven 10, such as, but not limited to, broiler heating element 26, bake heating element 28, convection fan 32, and magnetron 36, and convection heating element 30. In the exemplary embodiment, temperature sensor 38 is located at least partially within cavity 12 and microprocessor 48 is configured to receive an input from temperature sensor 38. Microprocessor 48 is programmed to perform functions described herein, and as used herein, the term microprocessor is not limited to just those integrated circuits referred to in the art as microprocessors, but broadly refers to computers, processors, microcontrollers, microcomputers, programmable logic controllers, application specific integrated circuits, and other programmable logic circuits, and these terms are used interchangeably herein.

In use, cooking selections are made by depressing tactile control buttons 24 and when the desired selection is displayed, pressing a start button. For example, many cooking algorithms can be preprogrammed in the oven memory for man different types of foods. When a user is cooking a particular food item for which there is a preprogrammed cooking algorithm, the preprogrammed cooking algorithm is selected by operating the control buttons 24 until the selected food name is displayed and then pressing a start button. Instructions and selections are displayed on display 44.

Figure 5:
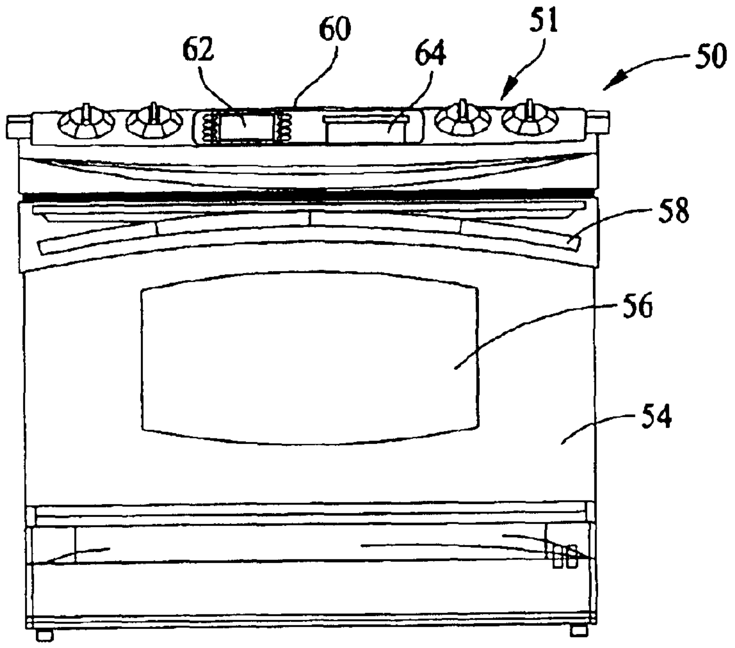
FIG. 5 is a front view of a speedcook range.
Figure 6:
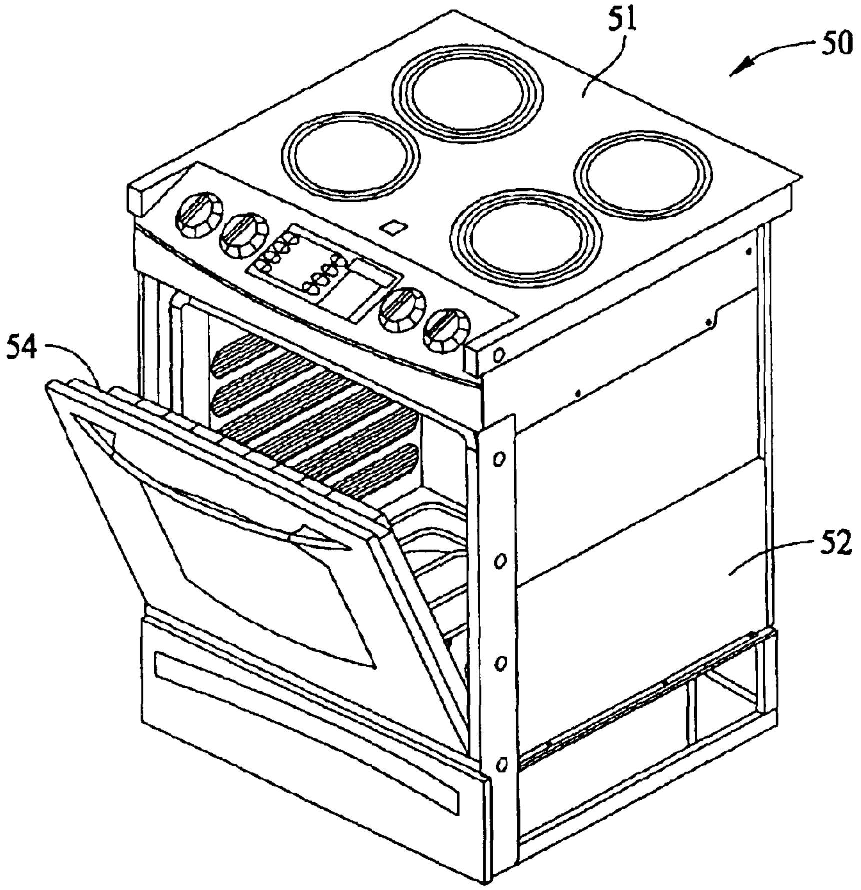
FIG. 6 is a perspective view of the oven shown in FIG. 4.
Figure 7:
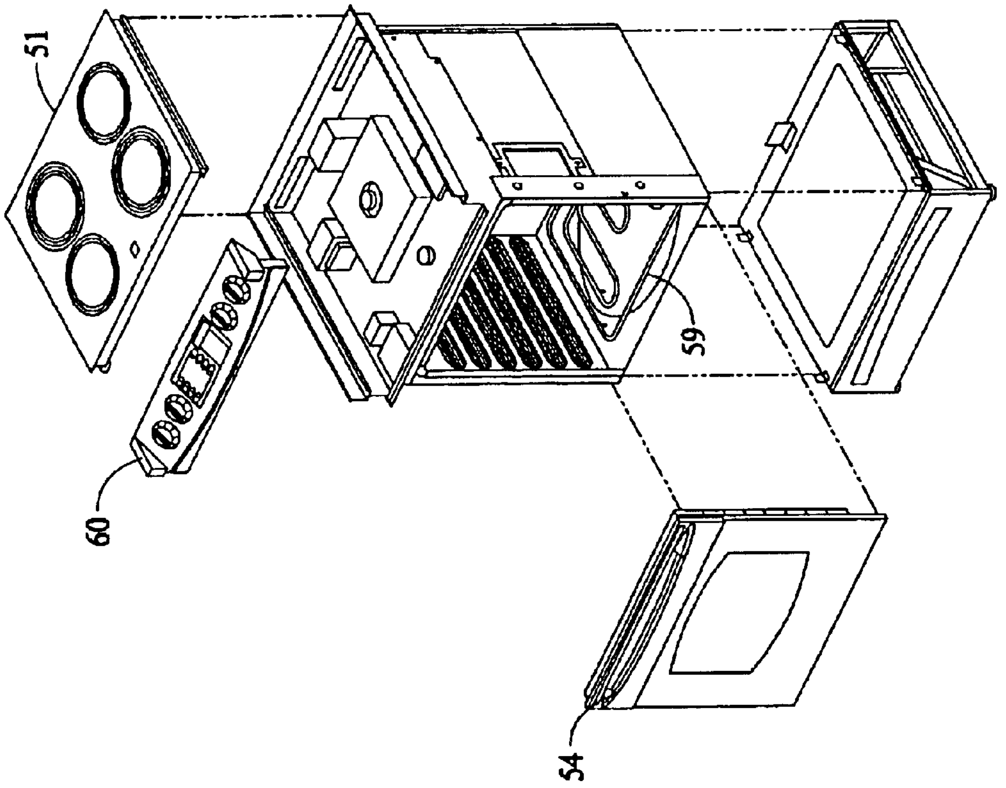
FIG. 7 is a schematic illustration of the oven shown in FIG. 4 and FIG. 5.

FIG. 5 is a front view of a speedcook oven 50 including a rangetop 51. FIG. 6 is a perspective view of speed cook oven 50. FIG. 7 is an exploded view of the oven shown in FIG. 5 and FIG. 6. In the exemplary embodiment, speedcook oven 50 includes an oven cavity 52, a door 54 including a window 56 provided for viewing food in oven cooking cavity 52, and a handle 58 is secured to door 54. Oven 50 also includes a control panel 60 that includes at least one display 62, a plurality of tactile control buttons 64, and various knobs or dials.:

Speedcooking oven 50 includes a broil heating element (not shown), a bake heating element 59, a convection heating element (not shown), a convection fan (not shown), and a convection motor (not shown) mechanically coupled to the convection fan such that heat generated by the convection element is provided to oven cavity 52. Speedcooking oven 50 also includes a magnetron (not shown) and a thermistor (not shown) configured to sense the temperature within cavity 52. In the exemplary embodiment, the broil heating element is located at a top area inside speedcooking oven 50 and bake heating element 59 is located at a bottom area inside speedcooking oven 50. The convection heating element and the convection fan are located at a back area inside speedcooking oven 50. A cover (not shown) can be provided to shield a user from the convection heating element and the convection fan. The magnetron is located approximately above the broil heating element.

The magnetron generates microwave energy to speed cook various food items, which are supported by a rack (not shown). The microwaves are evenly distributed inside speedcooking oven 50 by a microwave disbursement plate (not shown) positioned between the magnetron and the broil heating element. Door 54 of speedcooking oven 50 allows access to speedcooking oven 50. In the exemplary embodiment, speedcooking oven 50 also includes control panel 20 shown in FIG. 4.

Some of the cooking functions of ovens 10 and 50 include the further option of cooking in single rack mode or multirack mode. In single rack mode, food is being cooked only on one oven rack. In multirack mode, food items are being cooked on more than one oven rack. Display 22 includes a multi light (not shown). When the user selects oven/bake a first time, multi light is illuminated indicating that oven 10 is in multirack mode as explained in detail below. When the user selects oven/bake a second time, multi light is not illuminated indicating that oven 10 is in single rack mode as explained below.

The user can toggle between single rack mode and multirack mode. In one embodiment, however, multirack mode is the only mode. In an alternative embodiment, and rather than relying on user input regarding selection of the number of racks on which food is located, at least one sensor senses whether one rack or multiple racks (e.g., by pressure or weight on a rack, or by sensing the presence of baking ware) are being used and provides an indication of rack mode to an oven controller automatically. Additionally, multirack mode need not be the first mode. For example, when the user selects oven/bake a first time, multi light is not illuminated indicating that oven 10 is in single rack mode, and when the user selects oven bake a second time, multi light is illuminated indicating that oven 10 is in multirack mode.

In multirack cooking, food is placed at multiple levels within oven 10. Throughput of food through oven 10 is increased while maintaining evenness of cooking. Through the combination of speedcooking with multirack cooking, greater amounts of food are prepared quickly. Coordination and application of energy from bake element 28, broil element 26, convection element 30, and microwave source 36, is controlled by programmed algorithms in an oven controller.

Such algorithms generally combine radiant and microwave cooking modes with convection fan cycling and are used in speedcooking where the user has no specific recipe for the food being prepared. For instance, the algorithm includes a radiant phase where bake, and/or broil, and/or convection elements are operated with each element being turned on for a prescribed period of time. Also, there is a microwave phase, concurrently with the radiant phase, whereby the microwave source is cycled on and off. Additionally, a convection fan cycle includes reversal of fan direction of rotation concurrently with the radiant and microwave heating phases.

One such Algorithm 700, shown in FIG. 8, has empirically provided successful results. Algorithm 700 includes a radiant phase 710, a microwave phase 720, and a fan cycling phase 730. As applied to ovens 10 and 50, in radiant phase 710, convection element 30 is operated continuously with no off time. In microwave phase 720, there is a 30 second cycle where magnetron 36 is energized for 7 seconds and then deenergized for 23 seconds, after which the cycle is repeated. Microwave phase 720 operates concurrently with radiant phase 710. Convection fan cycling phase 730 also operates concurrently with radiant phase 710 and microwave heating phase 720, wherein convection fan 32 is operated on an 80 second cycle including 30 seconds rotating in one direction, and then 30 seconds rotating in the opposite direction, with 10 seconds allotted for the fan to slow down before reversing directions. Algorithm 700 is invoked when the user selects speedcook and multirack cooking mode.

Figure 9:
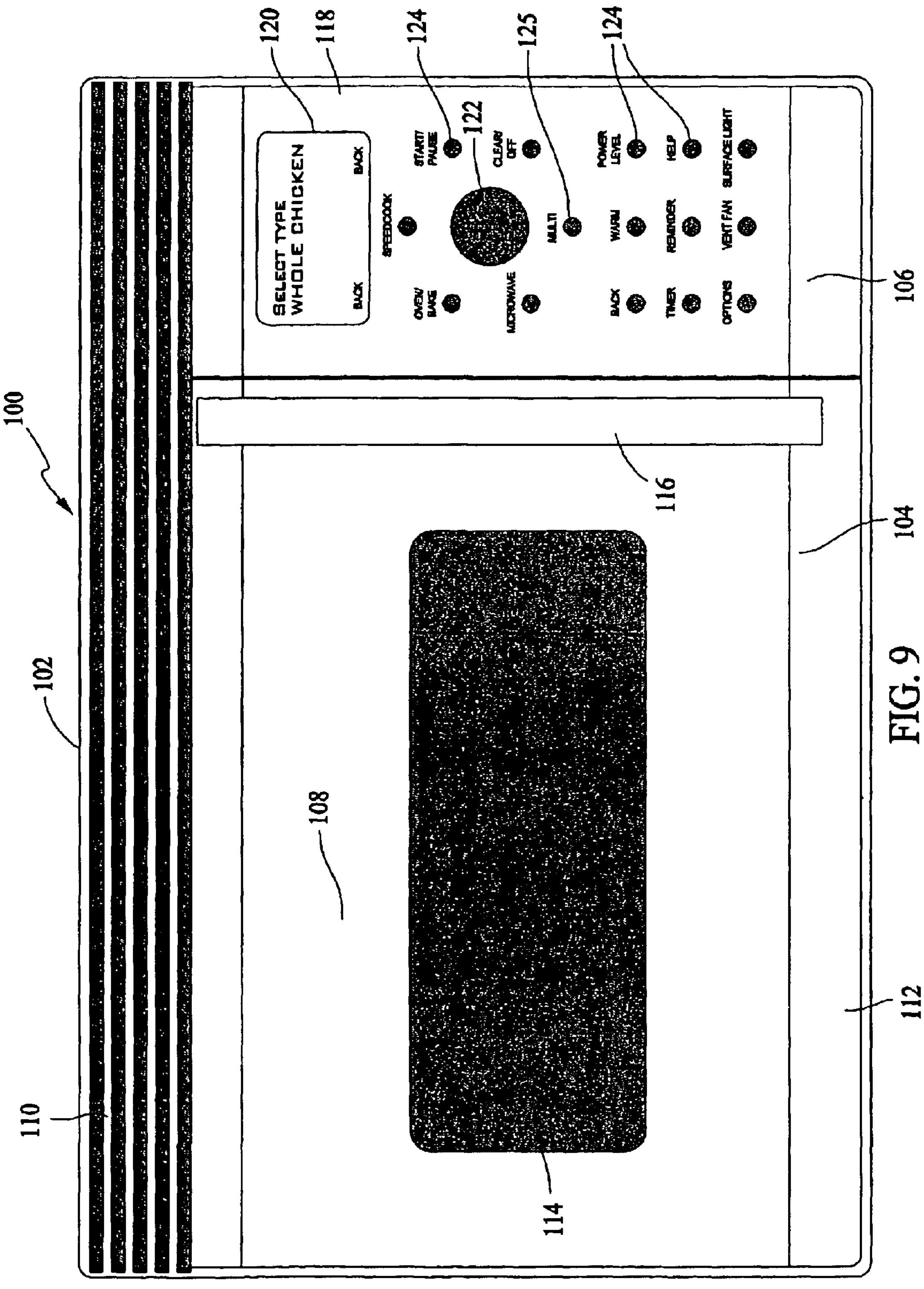
FIG. 9 is a front view of another embodiment of an oven.

FIG. 9 is a front view of an over the range type oven 100 in accordance with one embodiment of the present invention. Oven 100 includes an outer case 102, a plastic door frame 104, and a control panel frame 106. Oven 100 further includes a stainless steel door 108 mounted within door frame 104, an injection molded grille 110, and a bottom panel 112. A window 114 in door 108 is provided for viewing food in the oven cooking cavity, and an injection molded plastic handle 116 is secured to door 108. A control panel 118 is mounted within control panel frame 106.

Control panel 118 includes a display 120, an injection molded knob or dial 122, and tactile control buttons 124. Selections are made by rotating dial 122 clockwise or counterclockwise and when the desired selection is displayed, pressing dial 122. Instructions and selections are displayed on vacuum fluorescent display 120. A number of cooking modes are provided, including basic modes such as bake mode, broil mode, and microwave mode, in addition to a convection mode and a speedcook mode, all of which will be described in greater detail below.

Figure 10:
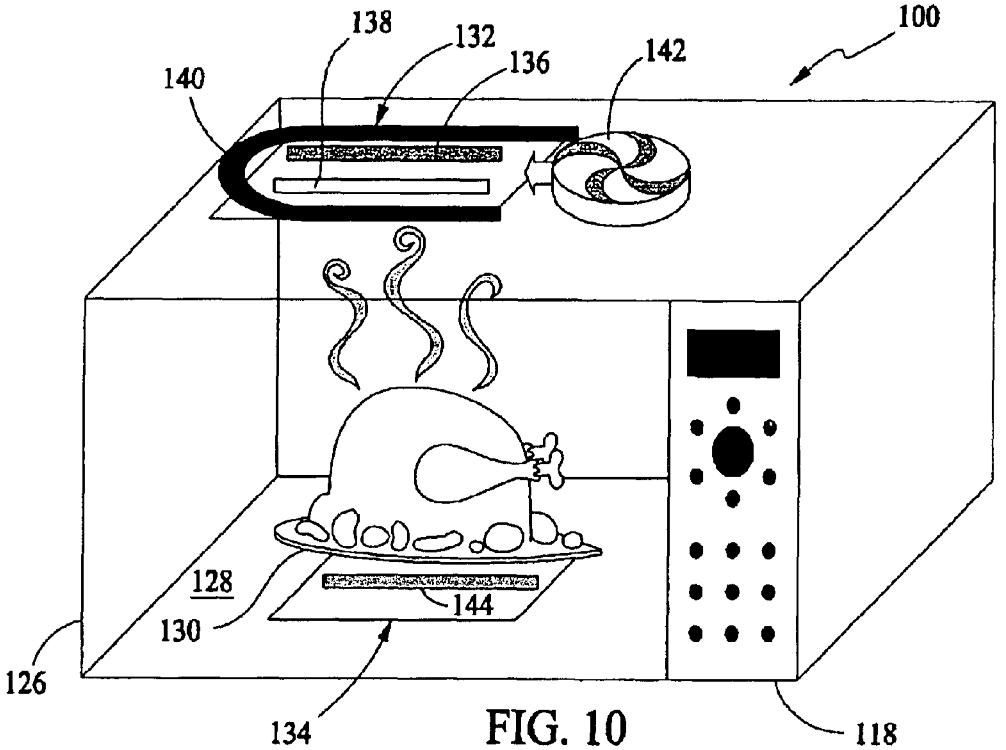
FIG. 10 is a schematic illustration of the oven shown in FIG. 9.

FIG. 10 is a schematic illustration of oven 100 shown in FIG. 9. As shown in FIG. 10, and in an exemplary embodiment , oven 100 includes a shell 126, and a cooking cavity 128 is located within shell 126. Cooking cavity 128 is constructed using high reflectivity (e.g., 72% reflectivity) stainless steel, and a turntable 130 is located in cavity 128 for locating food. Oven 100 includes a microwave module, for microwave cooking, among others, an upper heater module 132, for use in broil mode, among others, and a lower heater module 134, used in bake mode, among others. Microwave module includes a magnetron located on a side of cavity. Magnetron, in an exemplary embodiment, delivers a nominal 900 W into cavity according to standard IEC (International Electrotechnical Commission) procedure. Upper heater module 132 includes radiant heating elements illustratively embodied as a ceramic heater 136 and a halogen cooking lamp 138. In the exemplary embodiment, ceramic heater 136 is rated at 600 W and halogen cooking lamp 138 is rated at 500 W. Upper heater module 132 also includes a sheath heater 140. In the exemplary embodiment, sheath heater 140 is rated at 1100 W. A convection fan 142 is provided for blowing air over heating elements and into cooking cavity 128. Lower heater module 134 includes at least one radiant heating element illustrated as a ceramic heater 144 rated at 375 W.

The specific heating elements and RF generation system (e.g., a magnetron) can vary from embodiment to embodiment, and the elements and system. described above are exemplary only. For example, the upper heater module can include any combination of heaters including combinations of halogen lamps, ceramic lamps, and/or sheath heaters. Similarly, lower heater module can include any combination of heaters including combinations of halogen lamps, ceramic lamps, and/or sheath heaters. In addition, the heaters can all be one type of heater. The specific ratings and number of lamps and/or heaters utilized in the upper and lower modules can vary from embodiment to embodiment. Generally, the combinations of lamps, heaters, and RF generation system is selected to provide the desired cooking characteristics for speedcooking, microwave, and convection bake modes.

Figure 11:
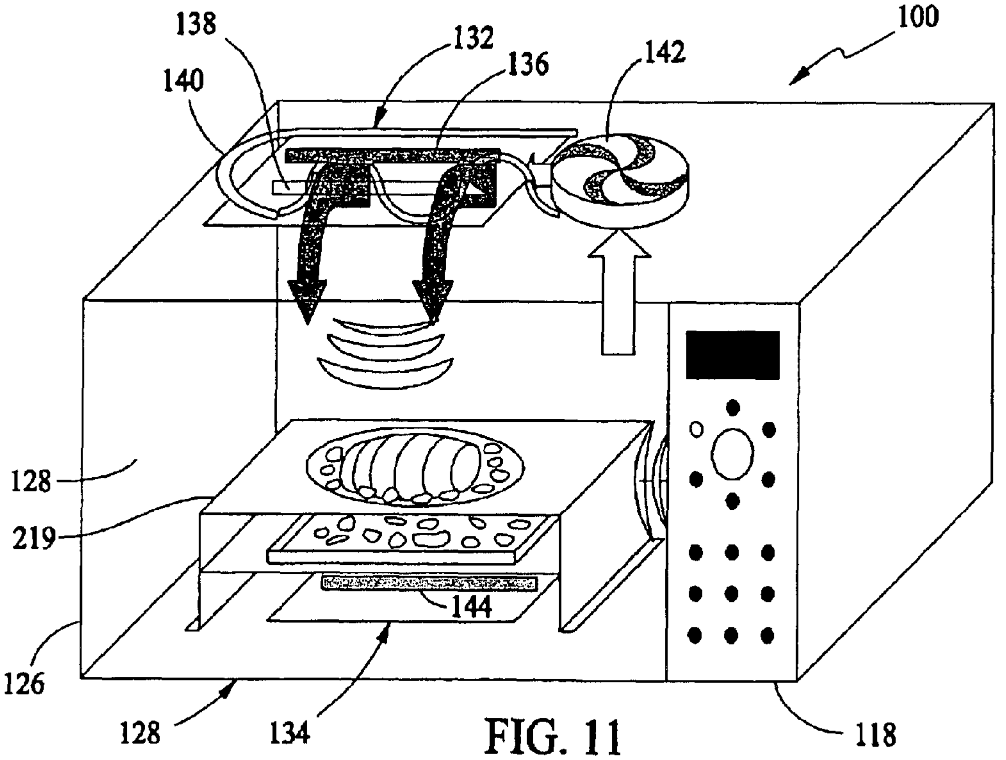
FIG. 11 is a schematic illustration of the oven shown in FIG. 9 in multirack speedcooking mode.

FIG. 11 is a schematic illustration of oven 100 including an oven rack 219 positioned within cooking cavity 128 for multirack cooking. It is to be understood that the oven floor is also a rack, and, though rack 219 includes two additional racks, there could be only one rack in addition to the oven floor in multirack cooking. When oven 100 is in multirack mode, it is not necessary that every rack in oven 100 contain food items, rather, this only indicates that food items are being prepared on more than one rack. Generally, for the speedcook mode, a user places food in cavity and selects "Speedcook" from control panel 118 and selects multirack mode if desired. The user then uses dial 122 to select a food type and then selects "Start". Radiant heaters 136 and 138 and convection fan 142 are used to heat the outside of the food, and microwave energy is used to heat the inside of the food. As described below in more detail, the radiant heaters and the magnetron are preferably cycled throughout the cooking cycle to provide the desired cooking results.

Some of the cooking options include the further option of a single rack mode or multirack mode. In single rack mode, food is being cooked only on one oven rack. In multirack mode, food items are being cooked on more than one oven rack. Control panel 118 includes a multi light 125. When the user selects oven/bake a first time, multi light 125 is illuminated indicating that oven 100 is in multirack mode as explained in detail below. When the user selects oven/bake a second time, multi light 125 is not illuminated indicating that oven 100 is in single. rack mode as explained below.

The user can toggle between single rack mode and multirack mode. However, in one embodiment, multirack mode is the only mode. In an alternative embodiment, and rather than relying on user input regarding selection of the number of racks on which food is located, at least one sensor senses whether one rack or multiple racks (e.g., by pressure or weight on a rack, or by sensing the presence of baking ware) arc being used and provides an indication of rack mode to an oven controller automatically. Additionally, multirack mode need not be the first mode. For example, when the user selects oven/bake a first time, multi light 125 is not illuminated indicating that oven 100 is in single rack mode, and when the user selects oven bake a second time, multi light 125 is illuminated indicating that oven 100 is in multirack mode. The following functions can be selected from respective key pads 124 of control panel 118.

SPEEDCOOK Selecting this pad enables an operator to perform the following speedcook functions: 1) manually enter speed cooking time, and powerlevels, and select single rack or multirack 2) select preprogrammed control algorithms, or 3)store manually programmed algorithms as recipes OVEN/BAKE Selecting this pad enables an operator to manually enter cooking time and temperature and select single rack or multirack for the oven/bake mode.

MICROWAVE Selecting this pad enables an operator to manually enter cooking time and power level for the microwave mode, as well as use pre-programmed microwave features, such as sensor cooking.

START/PAUSE Selecting this pad enables an operator to start or pause cooking.

CLEAR/OFF Selecting this pad stops all cooking and erases the current program.

MICROWAVE EXPRESS Selecting this pad enables an instant 30 seconds of full-power microwave for quick and easy warming of a sandwich, or reheat of coffee.

BACK Selecting this pad causes the oven to return to the previous selection.

WARM Selecting this pad causes the oven to enter the warming and reheating mode.

POWER LEVEL Selecting this pad enables adjusting the power levels for speed cooking and microwave cooking.

TIMER Selecting this pad controls a general purpose timer (e.g., minutes and seconds)

REMINDER Selecting this pad enables an operator to select a time at which an alarm is to sound.

HELP Selecting this pad enables an operator to find out more about the oven and its features.

OPTIONS Selecting this pad enables access to the auto night light, beeper volume control, clock, clock display, and display scroll speed features.

VENT FAN Selecting this pad enables an operator to clear the cooktop area of smoke or steam.

SURFACE LIGHT Selecting this pad turns ON/OFF the surface light for the cooktop.

While the invention has been described in terms of various specific embodiments, those skilled in the art will recognize that the invention can be practiced with modification within the spirit and scope of the claims.

What is claimed is:

1. An oven comprising:

a cooking cavity;

a plurality of racks within said cooking cavity, an RF generation module operationally coupled to said cooking cavity and configured to deliver microwave energy into said cooking cavity, at least one heat source positioned within said cavity and configured to supply heat energy to said cooking cavity, and a control configured to accept data regarding said plurality of racks, said control operationally coupled to said RF generation module, and said at least one heat source for selective control thereof based on the accepted data.

2. An oven in accordance with claim 1 wherein said at least one heat source comprises a bake element, a broil element, and a convection heating element.

3. An oven in accordance with claim 2 wherein said control operates said oven in a plurality of modes, at least one of said modes comprising a microwave mode, a speedcook mode, a bake mode, a convection mode, and a broil mode.

4. An oven in accordance with claim 3 wherein in said speedcook mode, said control is configured to control the energization of said bake element, said broil element, said convection element, and said RF generation module based on said data regarding said plurality of racks.

5. An oven in accordance with claim 3 wherein in said bake mode, said control is configured to selectively energize said bake element, said broil element, and said convection element based on said data regarding said plurality of racks.

6. An oven in accordance with claim 3 wherein in said convection mode, said control is configured to selectively energize said bake element, said broil element, and said convection element based on said data regarding said plurality of racks.

7. An oven in accordance with claim 3 further comprising a convection fan positioned proximate said convection element.

8. An oven in accordance with claim 7 wherein said fan is a reversible fan.

9. An oven in accordance with claim 8 wherein said control is configured to control said fan based on said data regarding said plurality of racks.

10. An oven in accordance with claim 8 wherein said control is configured to control said fan based on said plurality of modes.

11. An oven in accordance with claim 7 wherein said control is configured to deenergize said fan prior to reversing said fan.

12. A method for operating a multirack oven including a microprocessor, an RF generation module, a bake element, a broil element, and a convection element, said method comprising:

obtaining at least one input from a user indicative of whether the oven is to operate in a microwave mode, a convection mode, a bake mode, a broil mode, and a speedcooking mode;

obtaining a further input from a user indicative of a number of racks, and energizing the RF generation module, said bake element, said broil element, and said convection element in accordance with the user input.

13. A method in accordance with claim 12 wherein when the oven is to operate in the microwave mode, then the RF generation module is energized.

14. A method in accordance with claim 12 wherein when the oven is to operate in the convection mode, then the bake element, broil element, and convection element are energized based on said indication of a number of racks.

15. A method in accordance with claim 12 wherein when the oven is to operate in the speedcooking mode, then the RF generation module, the bake element, the broil element, and the convection element are energized based on said indication of a number of racks.

16. A method for operating a speedcook oven in a speedcook mode, said method comprising:

receiving an indication of a number of racks;

operating the oven in a predetermined radiant cooking cycle based on the received indication of a number of racks;

operating the oven in a predetermined microwave cooking cycle based on the received indication of a number of racks;

operating the oven in a predetermined convection fan cycle based on the received indication of a number of racks; and wherein said operating steps are performed concurrently for a user specified cooking time.

17. A method in accordance with claim 16 wherein the predetermined radiant cooking cycle comprises continuously energizing a convection heating.

18. A method in accordance with claim 16 wherein the predetermined microwave cooking cycle comprises:

operating said oven in a microwave mode for a predetermined microwave cooking time period; and turning off said microwave mode for a predetermined microwave off time period.

19. A method in accordance with claim 16 wherein the predetermined convection fan cycle comprises.

operating said convection fan in a first rotational direction for a first predetermined time interval; and operating said convection fan in a second rotational direction, opposite said first rotational direction, for a second predetermined fan-on time interval.

20. A method in accordance with claim 19 wherein said convection fan is deenergized before operating to change the rotational direction.

* * * * *

UNITED STATES PATENT AND TRADEMARK OFFICE

CERTIFICATE OF CORRECTION

PATENT NO. : 6,815,644 B1
APPLICATION NO. : 10/389874
DATED : November 9, 2004
INVENTOR(S) : Muegge et al.

It is certified that error appears in the above-identified patent and that said Letters Patent is hereby corrected as shown below:

<u>Column 7,</u>
Line 60, after "said cooking cavity" delete "," and insert -- ; --.
Line 63, after "energy into cooking cavity" delete "," and insert -- ; --.
Line 65, after "heat energy to said cooking cavity" delete "," and insert -- ; --.

<u>Column 10,</u>
Line 6, after "fan cycle comprises" delete "." and insert -- : --.

Signed and Sealed this

Eleventh Day of July, 2006

JON W. DUDAS
*Director of the United States Patent and Trademark Office*